(12) United States Patent
Abundis et al.

(10) Patent No.: US 7,143,940 B2
(45) Date of Patent: Dec. 5, 2006

(54) ELECTRONIC DEVICE THAT ACCEPTS AN ACCESSORY CARD, AND DESIGN METHODOLOGY THEREFOR

(75) Inventors: Gerardo Orozco Abundis, Greeley, CO (US); Theodore A Smith, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 10/295,576

(22) Filed: Nov. 15, 2002

(65) Prior Publication Data

US 2004/0094623 A1    May 20, 2004

(51) Int. Cl.
*G06K 7/00*    (2006.01)
(52) U.S. Cl. ............ 235/435; 361/796; 361/736; 174/50; 174/59; 174/60
(58) Field of Classification Search ........... 235/380, 235/475, 476, 479, 482–483; 361/679, 736–737, 361/740, 741, 796; 340/5.3, 5.31–5.32, 545.4, 340/545.6, 545.7; 174/50, 59, 60
See application file for complete search history.

(56) References Cited

U.S. PATENT DOCUMENTS

| 5,032,952 | A | * | 7/1991 | Cooke et al. ............... 361/747 |
| 5,228,319 | A | * | 7/1993 | Holley et al. ................. 70/58 |
| 5,923,537 | A | | 7/1999 | Kuo et al. |
| 6,388,880 | B1 | | 5/2002 | El-Ghobashy et al. |
| 6,491,226 | B1 | * | 12/2002 | Nishioka .................... 235/475 |

FOREIGN PATENT DOCUMENTS

JP        59165284 A  *  9/1984

\* cited by examiner

*Primary Examiner*—Jared J. Fureman
*Assistant Examiner*—Daniel A. Hess

(57) ABSTRACT

In a design methodology for an electronic device that accepts a removable accessory card, the electronic device is provided with an accessory card receptacle and a power connector. The power connector is positioned with respect to the accessory card receptacle such that an accessory card cannot be inserted into, or removed from, the accessory card receptacle while a power cord is connected to the power connector. An accessory card, and electronic devices that receive accessory cards, are also disclosed.

20 Claims, 8 Drawing Sheets

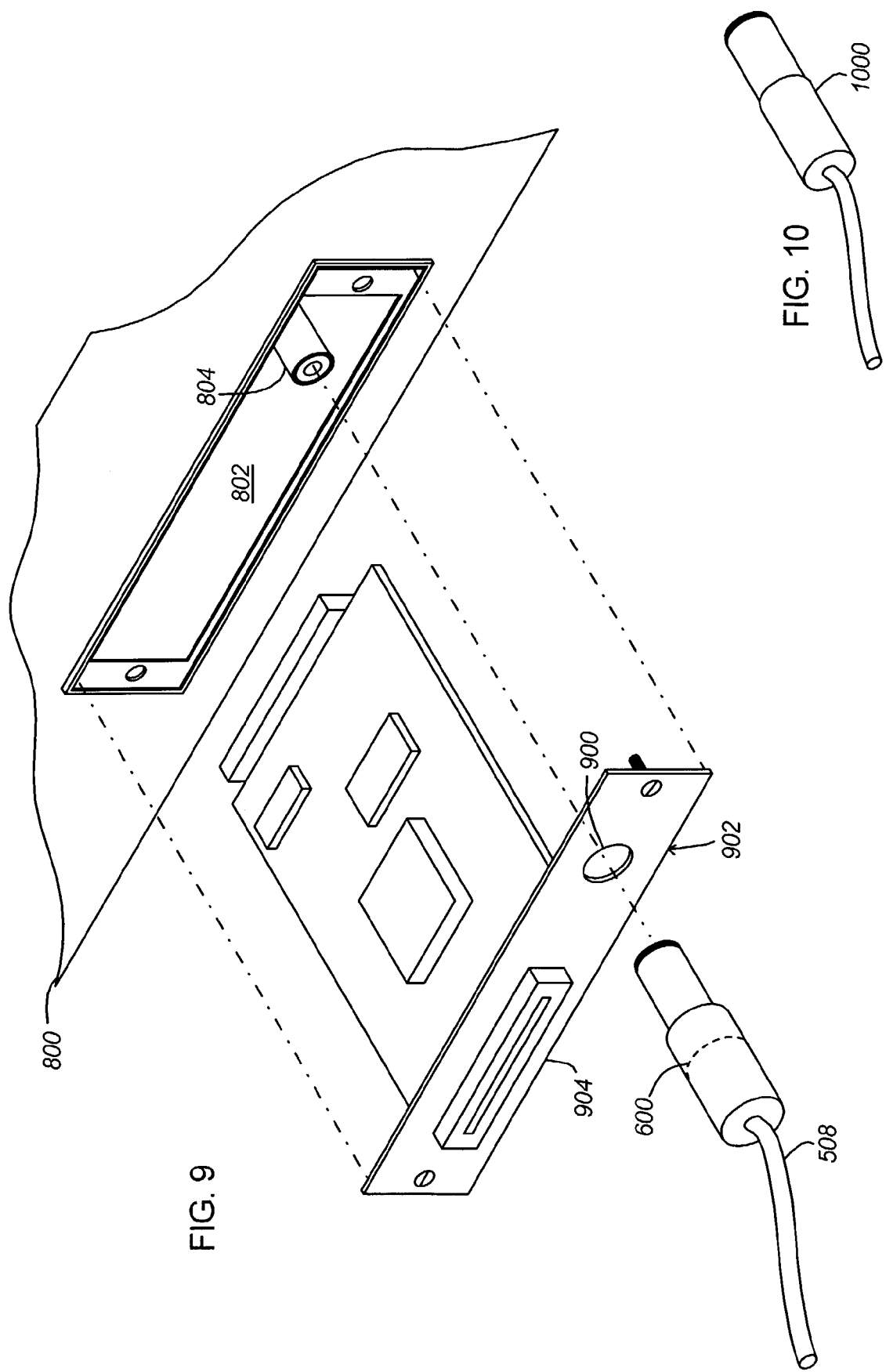

ELECTRONIC DEVICE THAT ACCEPTS AN ACCESSORY CARD, AND DESIGN METHODOLOGY THEREFOR

BACKGROUND OF THE INVENTION

Electronic devices (e.g., scanners, printers, copiers, computers) are sometimes provided with one or more accessory card receptacles, thereby enabling the configuration of the device to be changed. For example, a scanner might be provided with an accessory card receptacle for accepting a SCSI (Small Computer System Interface) or IEEE 1394 accessory card; or a copier might be provided with an accessory card receptacle for accepting a network interface card.

Typically, a user or technician that removes and/or inserts an accessory card is instructed to power down the device and disconnect its power cord. Although the user or technician will typically turn the device "off" (e.g., by pushing or flipping its power switch), they quite often fail to disconnect the device's power cord. This is hazardous for the user in that it exposes the user to a potentially harmful electrical discharge. It is hazardous for the device and accessory card in that it exposes each of these components to possibly damaging electrical discharges or surges.

SUMMARY OF THE INVENTION

One aspect of the invention is embodied in a design methodology for an electronic device that accepts a removable accessory card. In accordance with the methodology, the electronic device is provided with an accessory card receptacle and a power connector, with the power connector being positioned with respect to the accessory card receptacle such that an accessory card cannot be inserted into, or removed from, the accessory card receptacle while a power cord is connected to the power connector.

BRIEF DESCRIPTION OF THE DRAWINGS

Illustrative embodiments of the invention are illustrated in the drawings, in which:

FIG. 9 is an enlarged view of a portion of the FIG. 8 device, wherein the removable cover has been removed, and wherein an accessory card is being inserted into the device's accessory card receptacle;

FIG. 10 illustrates a streamlined power cord that may be substituted for the power cord shown in FIGS. 8 & 9.

DETAILED DESCRIPTION

Figure 1:
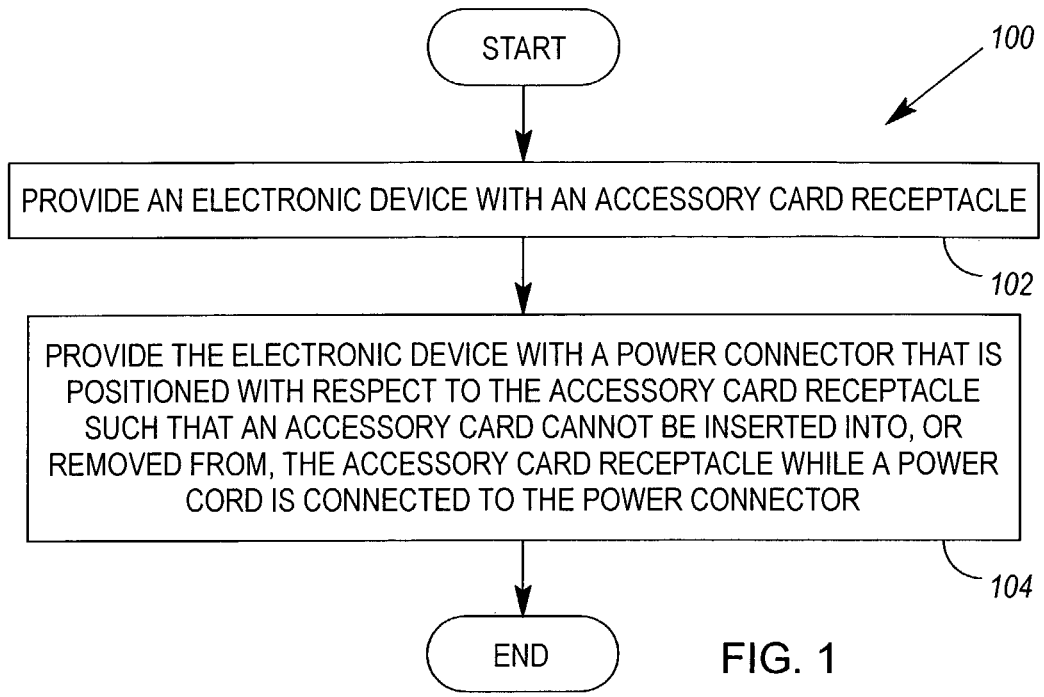
FIG. 1 illustrates an embodiment of a design methodology for an electronic device that accepts an accessory card.
Figure 5:
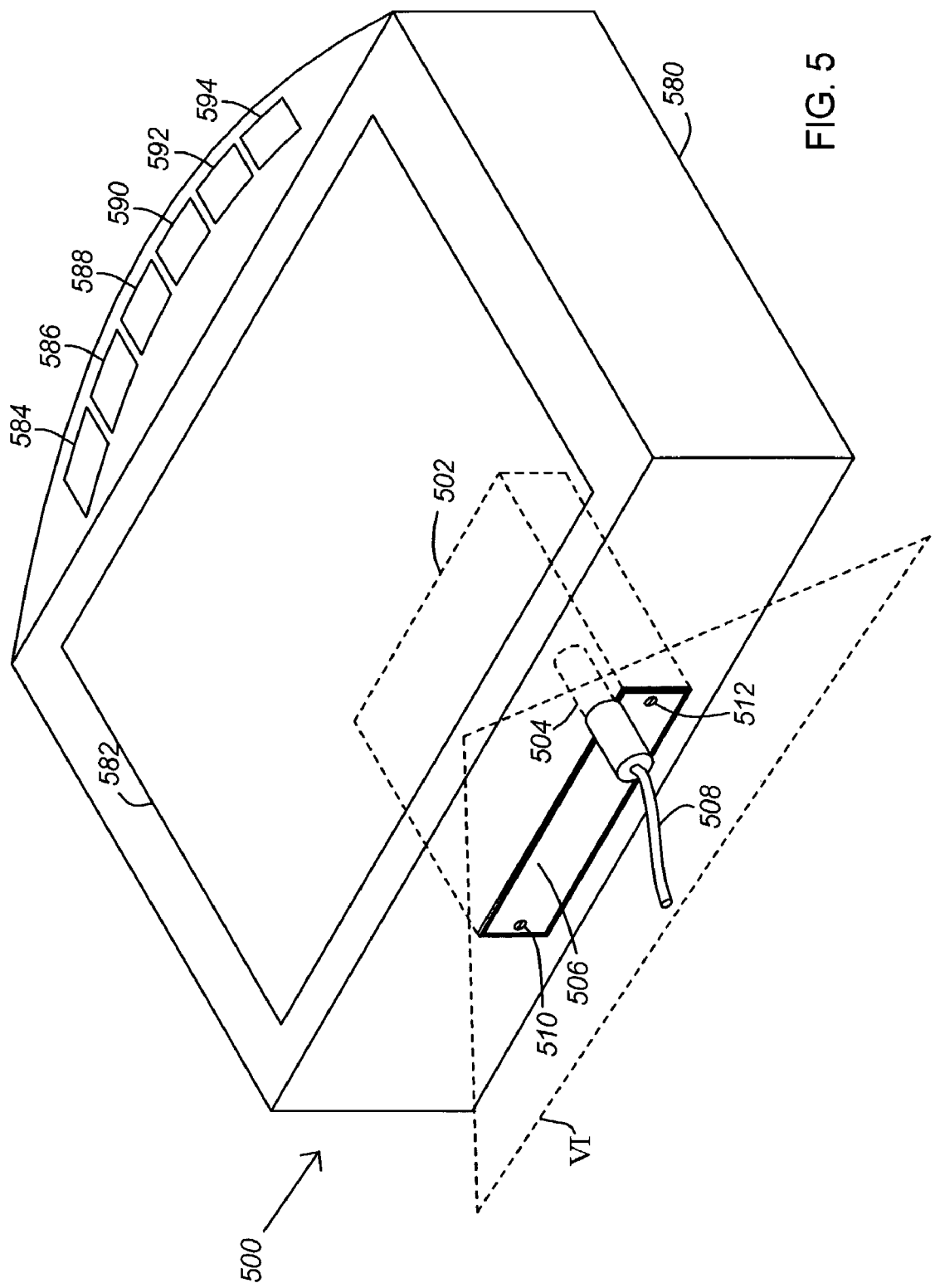
FIG. 5 illustrates a scanner having a removable cover and a power cord.
Figure 8:
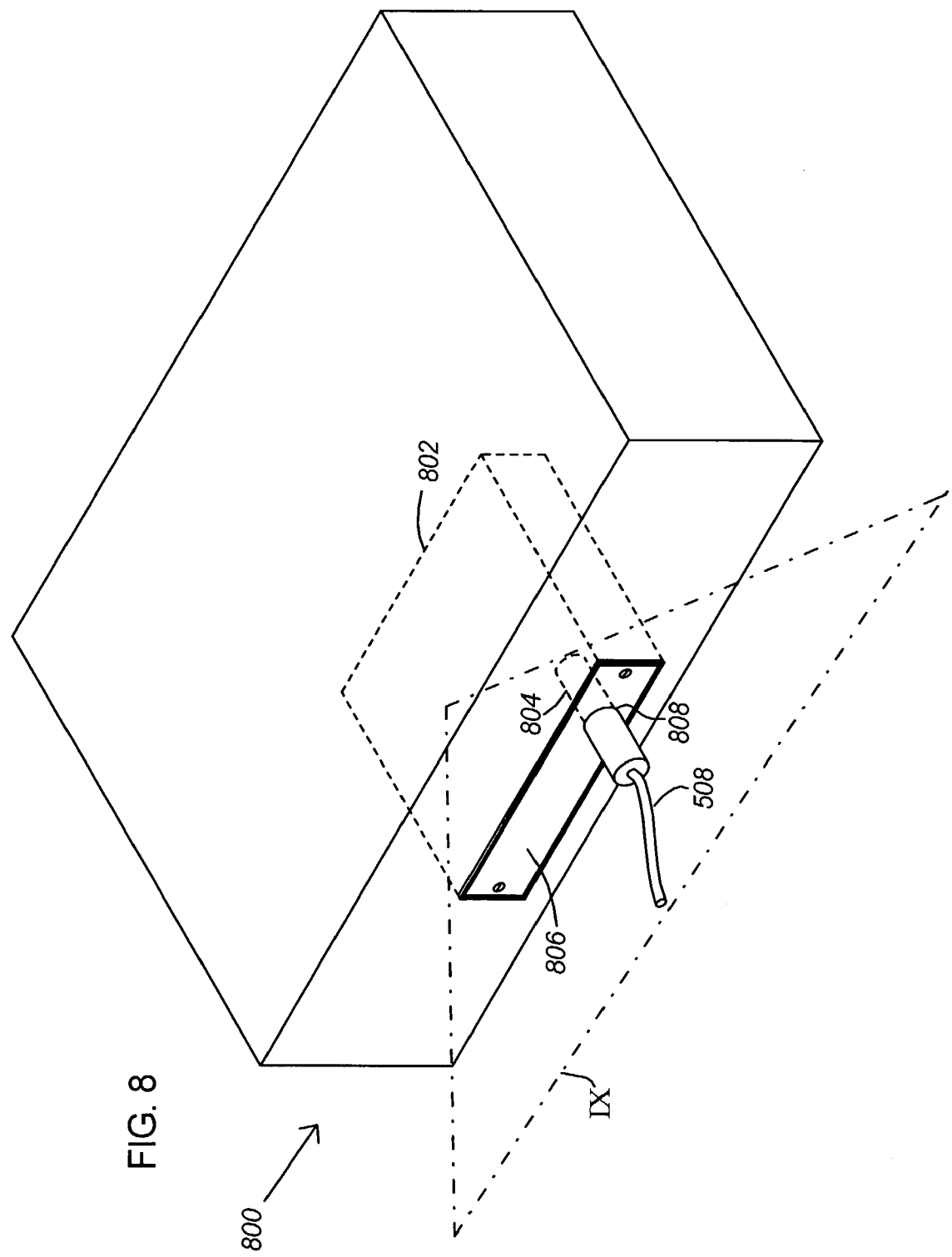
FIG. 8 illustrates an electronic device having a removable cover and a power cord.
Figure 11:
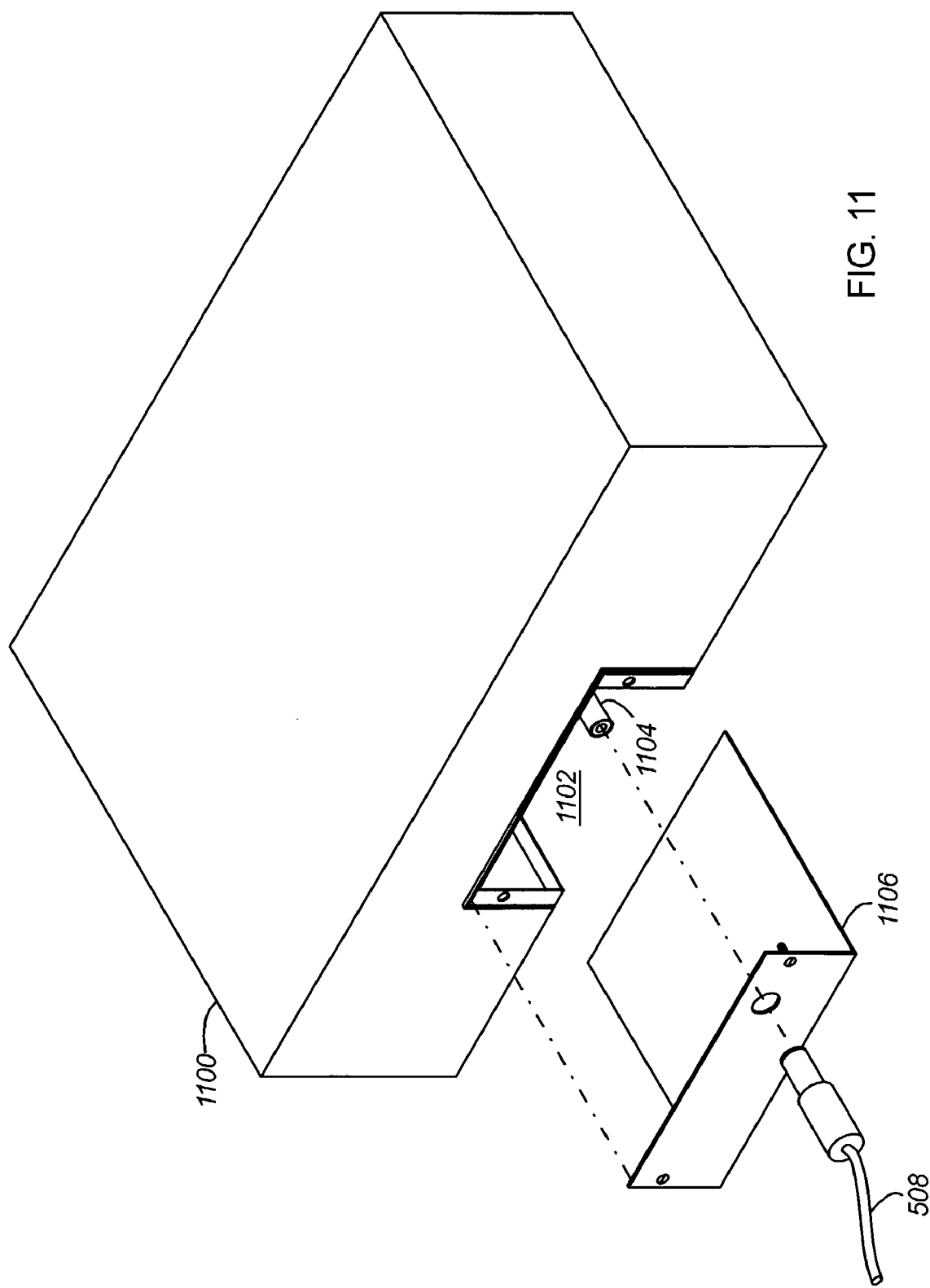
FIG. 11 illustrates an electronic device having an accessory card receptacle that is only partially defined by the device's housing.

FIG. 1 illustrates an embodiment of a design methodology 100 for an electronic device that accepts a removable accessory card. The methodology 100 comprises 1) providing 102 the electronic device with an accessory card receptacle, and 2) providing 104 the electronic device with a power connector that is positioned with respect to the accessory card receptacle such that an accessory card cannot be inserted into, or removed from, the accessory card receptacle while a power cord is connected to the power connector. Examples of devices that have been designed in accordance with this methodology 100 are illustrated in FIGS. 5, 8 and 11, and will be explained in more detail later in this description.

Although FIG. 1 depicts an order to the design methodology's steps 102, 104, the order of the steps may be reversed, and various other design steps may be inserted prior to, in between, or after the design steps 102, 104 shown. Thus, the order of the design methodology's steps 102, 104 is not as important as the designed relationship between a device's accessory card receptacle and power connector.

The FIG. 1 design methodology 100 forces a user to disconnect a device's power cord prior to inserting an accessory card into, or removing an accessory card from, an electronic device. By preventing a user from inserting or removing an accessory card while a device is powered (or at least connected to power), the design methodology 100 is able to protect a user from electrical discharge. At the same time, the design methodology 100 offers protection for the electrical device and accessory card by ensuring that neither is subjected to an electrical surge or discharge as a result of the device being powered when an accessory card is inserted into or removed from the device. The design methodology 100 also forms a foundation for the implementation of power cycling, wherein the act of disconnecting the power cord triggers electrical and/or mechanical devices to reset part or all of the device. For example, disconnection of the power cord could remove power to a volatile memory, thereby resetting the memory's registers and causing the device to enter a known state upon reconnection of the power cord.

The FIG. 1 design methodology 100 may be variously modified. Some of these modifications 200, 300, 400 are illustrated in FIGS. 2–4.

Figure 2:
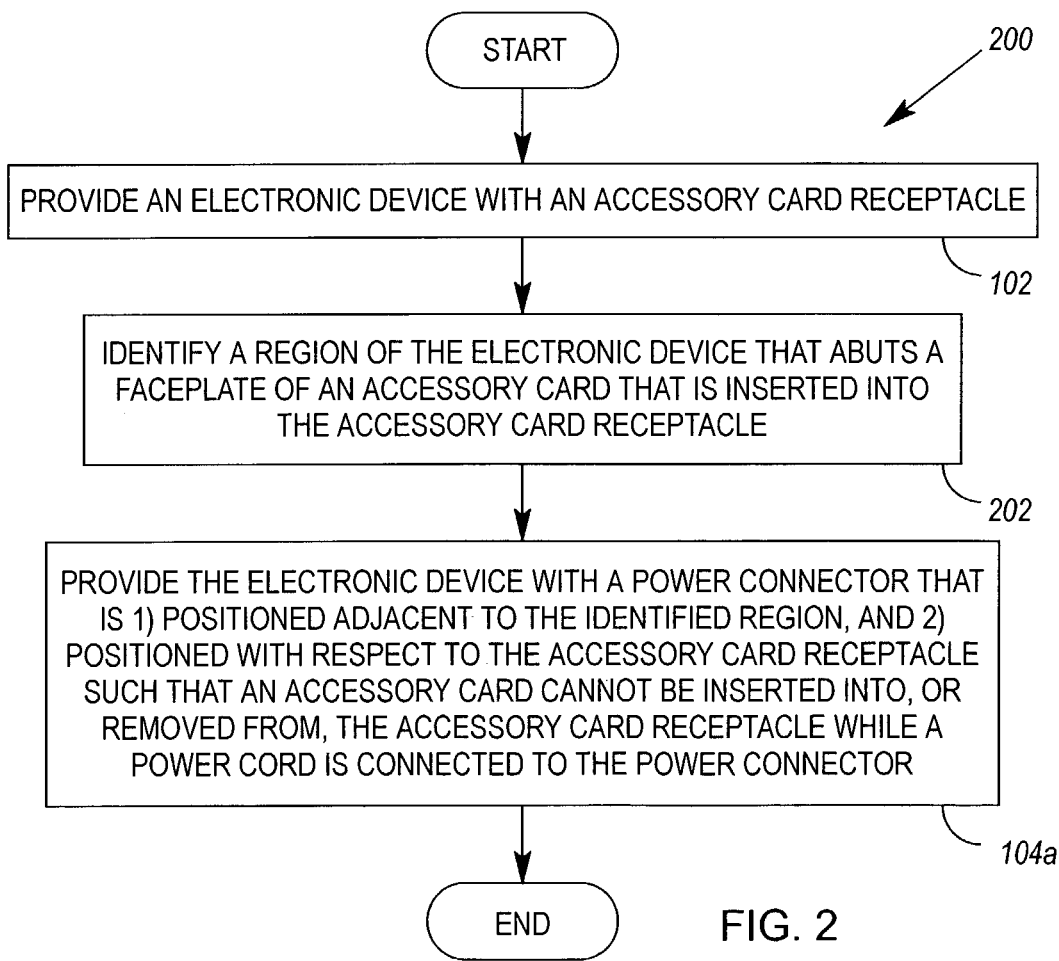
FIGS. 2–4 illustrate various modifications to the FIG. 1 methodology.

FIG. 2 illustrates a design methodology 200 which is a variant of that shown in FIG. 1. In FIG. 2, a region of the electronic device that abuts a faceplate of an accessory card is identified 202. The power connector is then positioned 104a adjacent to this region. An example of a device 500 designed in accordance with the FIG. 2 methodology 200 is illustrated in FIG. 5.

Figure 3:
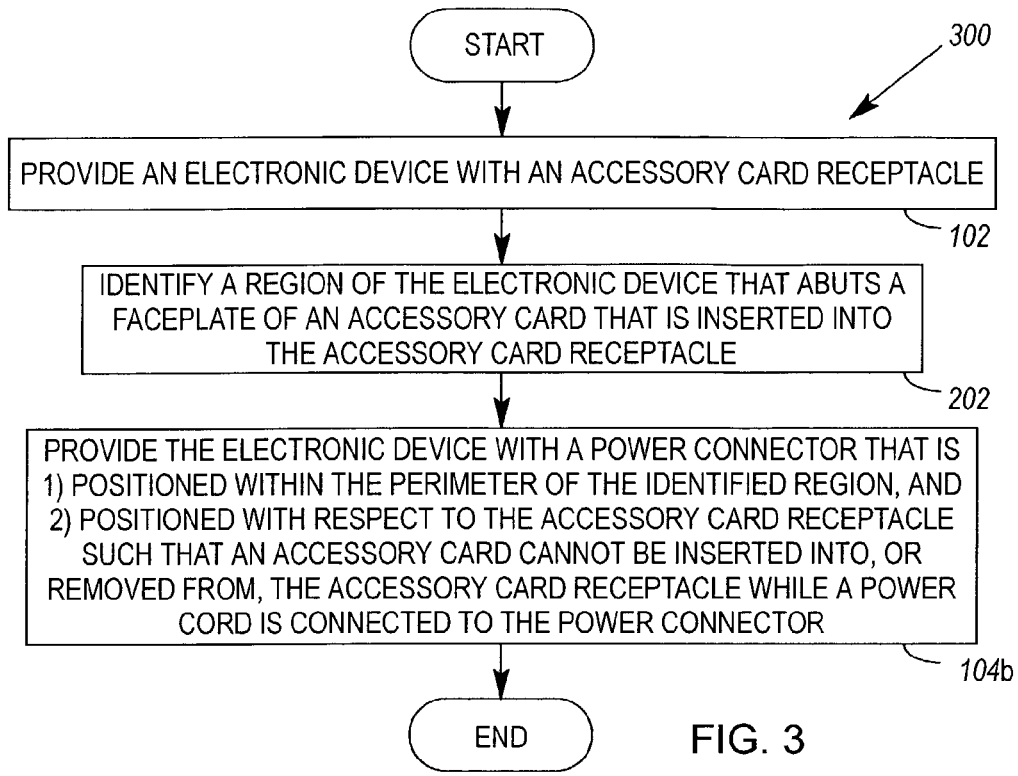

FIG. 3 illustrates a design methodology 300 that is similar to that illustrated in FIG. 2. However, after identifying 202 a region of the electronic device that abuts a faceplate of an accessory card, the power connector is positioned 104b within the perimeter of the identified region. An example of a device 800 designed in accordance with the FIG. 3 methodology 300 is illustrated in FIG. 8.

Figure 4:
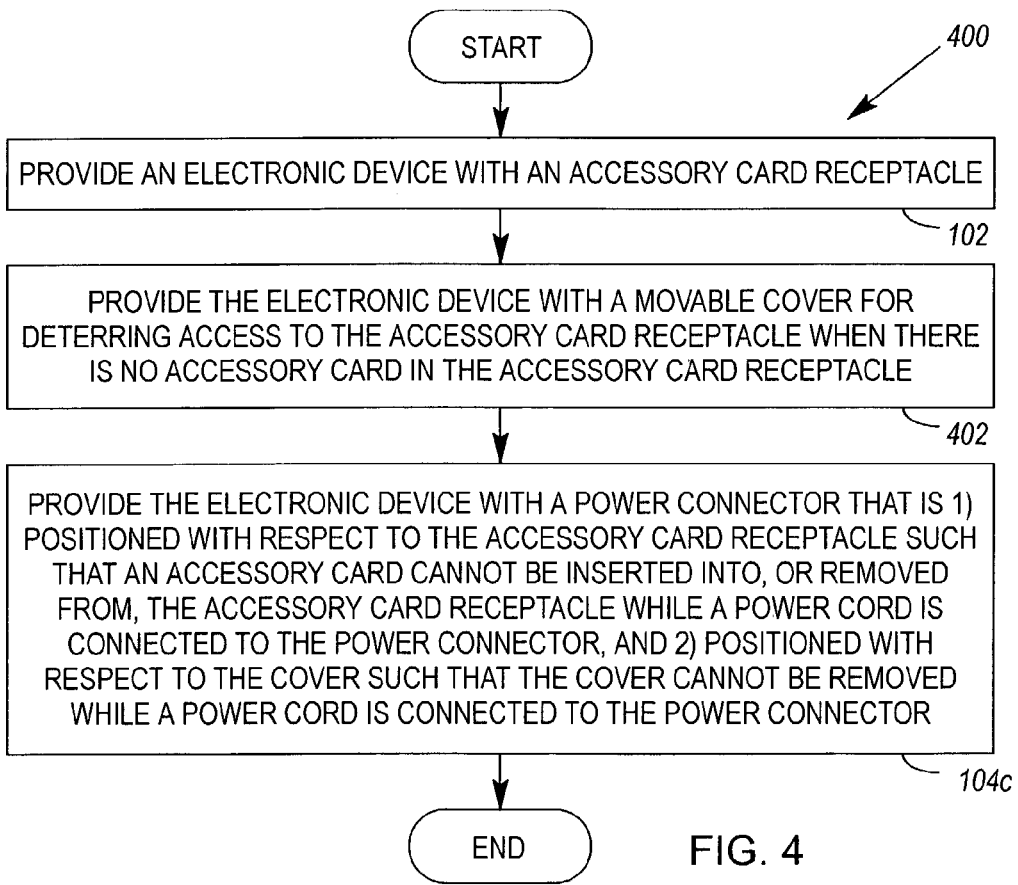

FIG. 4 illustrates a design methodology 400 which is another variant of that which is shown in FIG. 1. In FIG. 4, an electronic device is further provided 402 with a movable cover for deterring access to the accessory card receptacle when there is no accessory card in the accessory card receptacle. The electronic device is then provided with a power connector that is 1) positioned 104c with respect to the accessory card receptacle such that an accessory card cannot be inserted into, or removed from, the accessory card receptacle while a power cord is connected to the power connector, and 2) positioned 104c with respect to the cover such that the cover cannot be removed while a power cord is connected to the power connector. Examples of devices 500, 800, 1100 designed in accordance with the FIG. 4 methodology are illustrated in FIGS. 5, 8 & 11.

A number of electronic devices 500, 800, 1100 that protect a user, device, and accessory card from electrical surge or discharge are illustrated in FIGS. 5, 8 & 11. As previously noted, some or all of these devices may be designed in accordance with the design methodologies 100, 200, 300, 400 illustrated in FIGS. 1–4.

By way of example, the device 500 illustrated in FIG. 5 is a document scanner. However, the accessory card receptacle 502 and power connector 504 illustrated therein may be incorporated into various other types of devices, including a printer, copier, fax machine, computer, multi-function device, game console, or entertainment appliance, just to name a few. As a result, the size, form factors, and functionality of the devices 800, 1100 illustrated in FIGS. 8 & 11 are not shown, and the devices 800, 1100 are merely represented by generic box-like structures.

One will note that the scanner 500 illustrated in FIG. 5 is a flatbed scanner comprising a housing 580, platen 582 and a number of front panel function keys 584, 586, 588, 590, 592, 594. Although a flatbed scanner would normally have a lid (or platen cover), the scanner's lid is not shown.

Each of the devices 500, 800 illustrated in FIGS. 5 & 8 comprises an accessory card receptacle 502, 802; a power connector 504, 804; a removable accessory card receptacle cover 506, 806; and a power cord 508. The power connector 504, 804 is positioned near or in the accessory card receptacle 502, 802; and the power cord 508 has a perimeter that overlaps the removable cover 506, 806 when the power cord 508 is connected to the power connector 504, 804.

Figure 6:
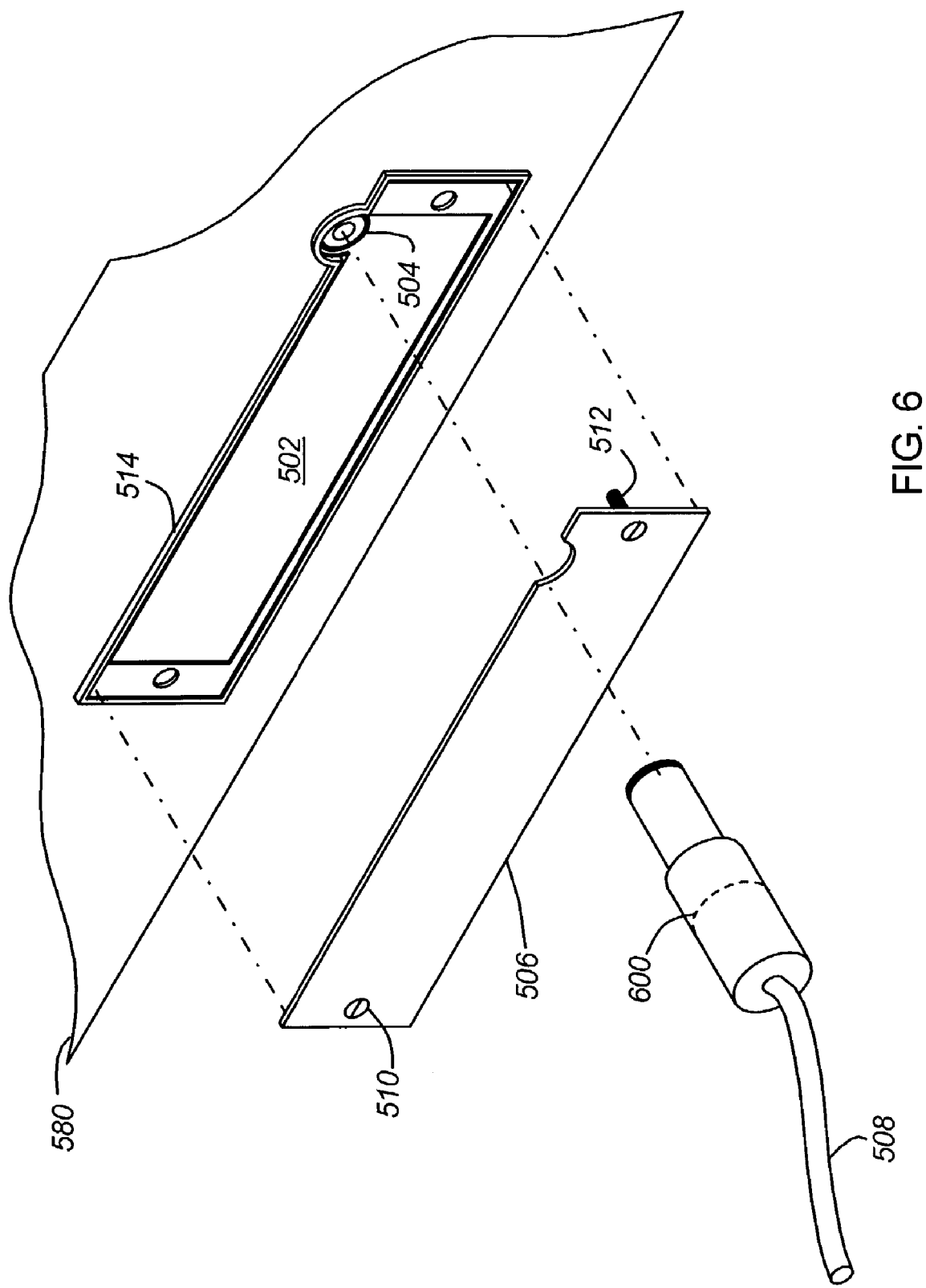
FIG. 6 is an enlarged view of a portion of the FIG. 5 scanner, wherein the cover and power cord have been removed.

In FIGS. 5 & 6, the outer perimeter of the removable cover 506 is shown to pass near the power connector 504. In this arrangement, the perimeter of the power cord 508 overlaps the outer perimeter of the removable cover 506, thereby deterring (if not preventing) a user from removing the cover 506 prior to disconnection of the power cord 508. Although FIG. 5 shows the cover 506 passing "near" the power connector 504, the cover 506 could alternately pass "over" the power connector 504 if such an arrangement would enable a power cord 508 to be connected to the power connector 504.

In FIGS. 5 & 6, the removable cover 506 is shown to mate to (and abut) a region of housing 580 defined by a raised bead 514. The raised bead 514 assists in aligning screws 510, 512 that are used to attach the cover 506 to the housing 580. One will note, however, that the screws are only an exemplary attachment means, and the cover could alternately be attached via clips, hinges, a slide, or some other means. With some attachment means (e.g., screws), the cover will be removable from the housing 580. With other attachment means (e.g., a slide), the cover may only be movable with respect to the housing 580.

FIG. 6 illustrates the cover 506 after it has been removed from the scanner 500. The power cord 508 has also been removed (i.e., disconnected) from the scanner 500. Because the power cord 508 has a perimeter 600 that overlaps the outer perimeter of the cover 506, the cover 506 cannot be removed (as shown) without the power cord being disconnected first. In accordance with at least some of the inventive principles disclosed herein, and depending on the design constraints for a particular electronic device, it is conceivable that a power cord's perimeter might not prevent the removal of the cover 506 without prior disconnection of the power cord 508. However, the power cord's overlap of the cover 506 at least deters a user's removal of the cover 506 prior to disconnection of the power cord 508 (e.g., if the power cord 508 presents a significant enough obstruction to removal of the cover 506, a user or technician will find it easier to disconnect the power cord 508 than to attempt removal of the cover 506 with the power cord 508 remaining in place).

Figure 7:
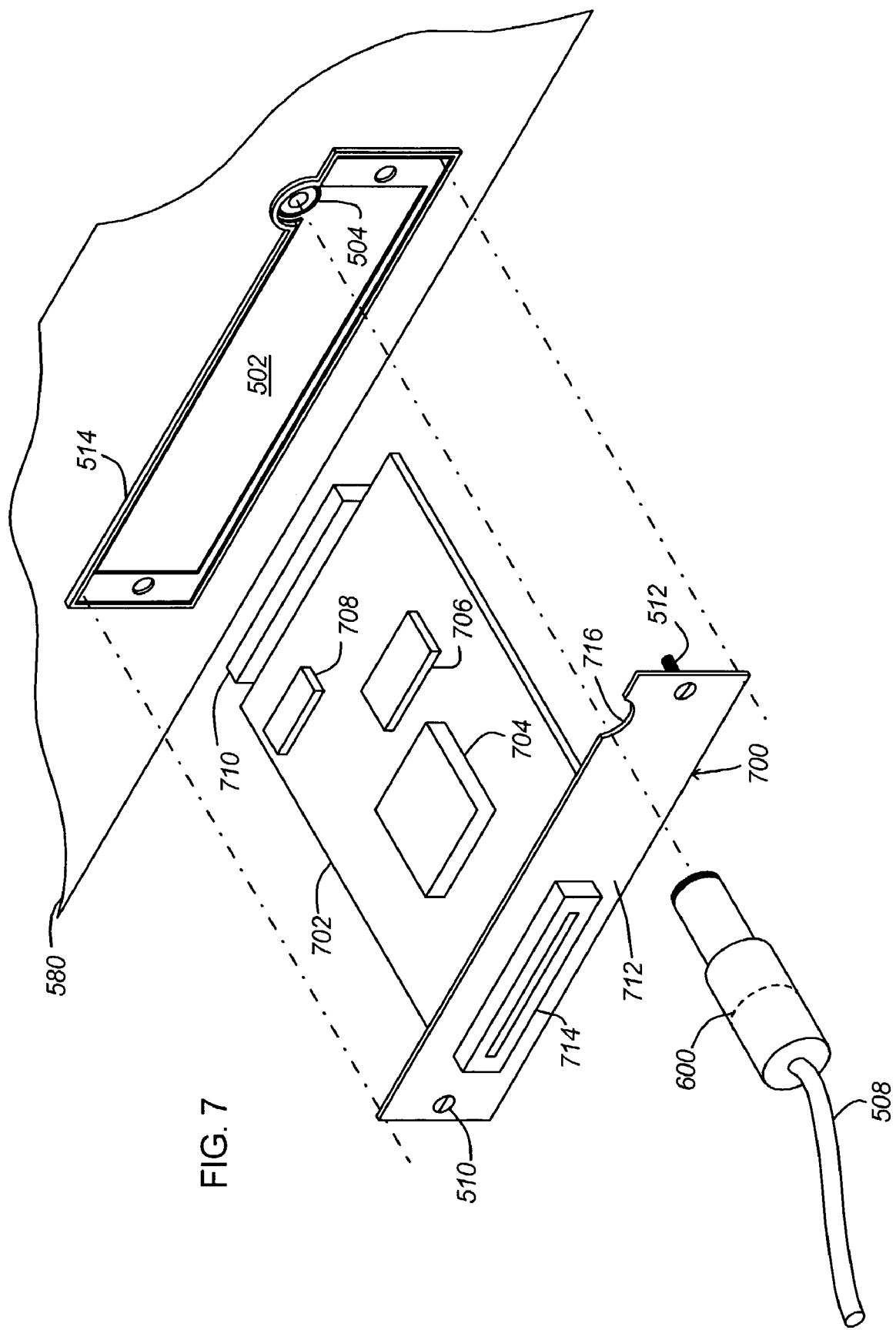
FIG. 7 illustrates the insertion of an accessory card into the accessory card receptacle shown in FIG. 6.

Once the cover 506 has been removed from the scanner 500 (or merely moved if it is attached by means of a hinge, for example), an accessory card 700 can be inserted into the scanner's accessory card receptacle 502. In FIG. 7, the accessory card 700 is shown to comprise a body 702 (e.g., a printed circuit board) carrying one or more electrical circuits (e.g., integrated circuits 704, 706, 708). Connected to one end of the card's body 702 is a connector 710 that is configured and positioned to mate with a corresponding connector positioned within the accessory card receptacle 502. Connected to the other end of the card's body 702 is a faceplate 712 comprising a notch 716 through which the scanner's power cord 508 passes. Depending on the nature of the accessory card 700, the card 700 may have one or more connectors 714 mounted to the faceplate 712.

The accessory card 700 is inserted into its receptacle 502 as shown in FIG. 7. Once inserted, the faceplate 712 of the accessory card 700 seats against the scanner's housing 580 similarly to the removable cover 506. Although the faceplate 712 illustrated in FIG. 7 is shaped more or less identically to that of the cover 506 illustrated in FIGS. 5 & 6, it is certainly not necessary that the two components 506, 712 have an identical shape.

Referring now to FIGS. 8 & 9, the removable cover 806 for the FIG. 8 device 800 is shown to have a hole 808 that is positioned over the power connector 804. The hole 808 may be of any size and shape. By means of this arrangement, inserting the power cord 508 through the hole 808 causes the perimeter of the power cord 508 to overlap some or all of the perimeter of the hole 808. In this manner, a user cannot remove (or move) the cover 806 without first disconnecting the power cord 508.

FIG. 9 illustrates the insertion of an accessory card 902 into the device's accessory card receptacle, after the receptacle's cover 806 has been removed. But for the faceplate 904 of the accessory card having a hole 900 in lieu of the notch 716 found in the FIG. 7 accessory card 700, the accessory card 902 shown in FIG. 9 is identical to the accessory card 700 shown in FIG. 7. As a result, a detailed description of the accessory card 902 will not be repeated.

In referring to FIG. 9, one will recognize that the accessory card 902 cannot be inserted into its receptacle 802 while the power cord 508 is connected to the device's power connector 804. Furthermore, once inserted, a user cannot remove the accessory card 902 from its receptacle 802 without first disconnecting the power cord 508 from the power connector 804.

The configuration of the power cord 508 in FIGS. 5–9 is exemplary only, and it should be understood by those of ordinary skill in the art that a power cord could be variously configured. By way of example, the power cord 508 illustrated in FIGS. 5–9 is shown to have a stepped profile at its end that connects to a power connector 504, 804. In this manner, the diameter of one of the steps in the cord's profile defines the perimeter 600 of the power cord that overlaps the removable cover 506, 806 or accessory card 700, 902.

Although the power cord 508 is shown to overlap the perimeter of the cover hole 808 and faceplate hole 900 in FIGS. 8 & 9, some of the inventive principles set forth herein may be implemented without such an overlap. For example, if the streamlined power cord 1000 shown in FIG. 10 is substituted for the power cord 508 shown in FIGS. 8 & 9, the perimeter of the streamlined power cord 1000 may not "wholly prevent" a user from removing the cover 806 or accessory card 902 from the device 800. However, given that the hole 808, 900 in the cover 806 or accessory card 902 is likely to be smaller in diameter than any AC adapter that is integrated with the power cord 1000, a user will be likely to disconnect the power cord 1000 before attempting any sort of access to the accessory card receptacle 802.

In FIGS. 5–9, an accessory card receptacle 502, 802 is shown to protrude into the electronic device's housing 580, 800. However, as shown in FIG. 11, an accessory card receptacle 1102 need only be partially defined by a device's housing 1100. By way of example, FIG. 11 shows a removable cover 1106 that wraps from the back to the underside of a device 1100. As in FIG. 8, a power cord 508 passes through the cover 806 to make connection with a power connector 1104 that is positioned within the receptacle 1102.

What is claimed is:

1. A design methodology for an electronic device that accepts a removable accessory card, comprising:
    providing the electronic device with an accessory card receptacle; and
    providing the electronic device with a power connector that is positioned with respect to the accessory card receptacle such that an accessory card cannot be inserted into, or removed from, the accessory card receptacle while a power cord is connected to the power connector.

2. The design methodology of claim 1, further comprising:
    identifying a region of the electronic device that abuts a faceplate of an accessory card that is inserted into the accessory card receptacle; and
    positioning the power connector adjacent to the region.

3. The design methodology of claim 1, further comprising:
    identifying a region of the electronic device that abuts a faceplate of an accessory card that is inserted into the accessory card receptacle; and
    positioning the power connector within the perimeter of the region.

4. The design methodology of claim 1, further comprising:
    providing the electronic device with a movable cover for deterring access to the accessory card receptacle when there is no accessory card in the accessory card receptacle; and
    positioning the power connector with respect to the cover such that the cover cannot be removed while a power cord is connected to the power connector.

5. An electronic device, comprising:
    an accessory card receptacle;
    a power connector;
    a movable accessory card receptacle cover; and
    a power cord having a perimeter that overlaps the movable cover as a result of the power cord being inserted into to the power connector.

6. The electronic device of claim 5, wherein the perimeter of the power cord overlaps the outer perimeter of the movable cover.

7. The electronic device of claim 5, wherein the movable cover has a hole that is positioned over the power connector.

8. The electronic device of claim 5, wherein:
    the end of the power cord that connects to the power connector has a stepped profile; and
    the diameter of a step in said profile defines said perimeter that overlaps the removable cover when the power cord is connected to the power connector.

9. The electronic device of claim 5, further comprising a housing, wherein the accessory card receptacle protrudes into the housing.

10. The electronic device of claim 5, further comprising a housing, wherein the accessory card receptacle is partially defined by the housing.

11. The electronic device of claim 5, wherein the movable cover is removable from the electronic device.

12. The electronic device of claim 5, wherein the movable cover is slidably attached to the electronic device.

13. The electronic device of claim 5, wherein the movable cover is hinged to the electronic device.

14. An electronic device, comprising:
    an accessory card receptacle;
    a power connector; and
    a movable accessory card receptacle cover, covering the accessory card receptacle and power connector, comprising a hole through which a power cord for the electronic device passes as a result of connecting the power cord to the power connector.

15. The electronic device of claim 14, further comprising the power cord, wherein the power cord has a perimeter that overlaps the movable cover when the power cord is inserted through the hole in the movable cover.

16. The electronic device of claim 14, wherein the movable cover is removable from the electronic device.

17. The electronic device of claim 14, wherein the movable cover is slidably attached to the electronic device.

18. The electronic device of claim 14, wherein the movable cover is hinged to the electronic device.

19. Apparatus, comprising:
    an accessory card having,
        a body carrying one or more electrical circuits; and
        a faceplate, connected to the body, comprising a hole through which a power cord for an electronic device that accepts the accessory card passes.

20. The accessory card of claim 19, wherein the body is a printed circuit board.

* * * * *

UNITED STATES PATENT AND TRADEMARK OFFICE
CERTIFICATE OF CORRECTION

| | | |
|---|---|---|
| PATENT NO. | : 7,143,940 B2 | Page 1 of 1 |
| APPLICATION NO. | : 10/295576 | |
| DATED | : December 5, 2006 | |
| INVENTOR(S) | : Gerardo Orozco Abundis et al. | |

It is certified that error appears in the above-identified patent and that said Letters Patent is hereby corrected as shown below:

In column 6, line 7, in Claim 5, after "into" delete "to".

Signed and Sealed this

Fifth Day of May, 2009

JOHN DOLL
*Acting Director of the United States Patent and Trademark Office*